Patented Jan. 3, 1939

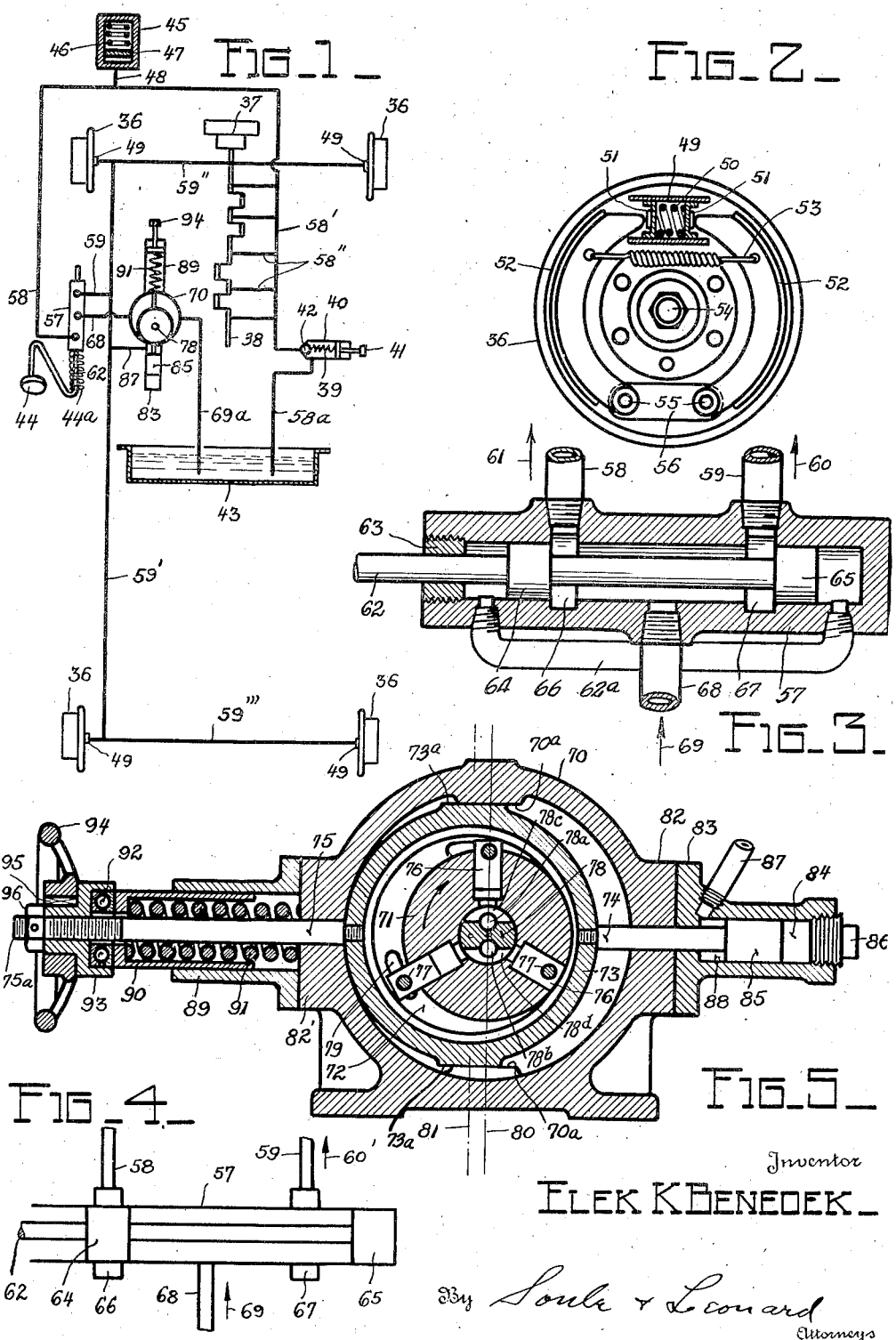

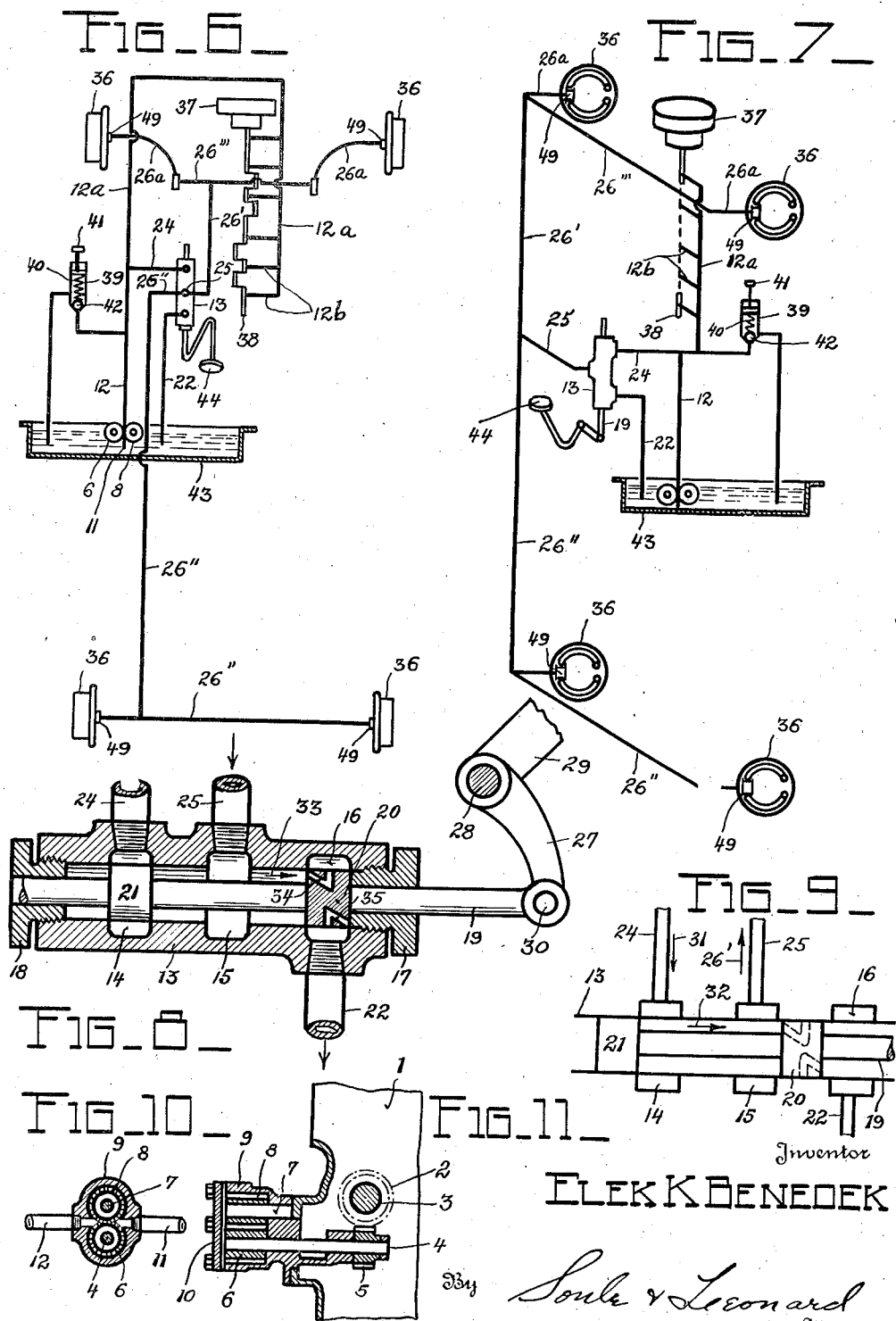

2,142,709

UNITED STATES PATENT OFFICE 2,142,709

POWER OPERATED HYDRAULIC BRAKE SYSTEM FOR MOTOR VEHICLES

Elek K. Benedek, Bucyrus, Ohio

Application September 14, 1934, Serial No. 744,087

12 Claims. (Cl. 188—152)

This invention relates to power operated hydraulic brake systems for automobiles and the like, and has for its primary object the provision of a practical and highly efficient means for the lubrication of the vehicle and for the operating of its brakes.

One object of the invention is to relieve the operator of the vehicle from power exertion while operating the brakes to thereby keep him alert and free from fatigue for greater safety and better control of the vehicle by the use of pressure power generated by the engine of the vehicle in cooperation with a suitable hydraulic pump to operate the brakes; relieving the driver from this task. With the novel arrangement the driver has merely to operate a push button or a pilot valve which in turn will direct the pressure fluid into the brakes, or into the crankshaft bearings e. g. of the motor as the case may be.

Another object is to provide variable displacement hydraulic power means to deliver a large volume of fluid into the motor crankshaft bearings and/or pistons and cylinders of the motor for the purpose of lubrication at substantially low pressure, as is necessary for that purpose. The range of lubricating low pressure is about from 40 to 60 pounds per square inch. The delivery of the large volume of oil at low pressure is during the normal operation of the vehicle, i. e. when the brakes are not in use.

A further object is the provision of variable delivery pump means which will deliver a small volume of brake operating fluid at substantially high pressure when the brake requires operating and the pressure must be maintained in the brake cylinders at a predetermined maximum value during the entire time of such brake operation, which means will operate at maximum possible efficiency, i. e. requiring a minimum expenditure of driving power on part of the driving engine of the vehicle.

A specific object is the provision of apparatus of the type above outlined, having automatic pressure responsive control means for the hydraulic pump, which will set the pump for its maximum stroke during the lubricating period, whereby the pump will deliver a large volume of oil at low pressure, and which will automatically reduce the stroke of the pump to a minimum required to maintain the predetermined maximum brake operating pressure for an indefinite time, as for braking a heavy vehicle on a long hill.

A further object is the provision of appropriate valve means whereby the operator may selectively direct the discharge of the pump into the automobile parts to be lubricated or into the brakes as desired.

A further object is the provision of pressure energy accumulating means in the system, or oil circuit, to thereby provide the desired fluid pressure for the proper lubrication of the vehicle during the brake operating period as well as when the brakes are idle.

Other more specific objects and advantages will appear from the description of the embodiments of my present invention illustrated in the accompanying drawings.

In the drawings:

Fig. 1 is a diagrammatic view of one embodiment of my novel hydraulic power operating system, showing the arrangement of the individual coacting members of the system in a hydraulic oil circuit;

Fig. 2 shows a suitable example of a wheel brake (conventional design) in side elevation, with the brake operating hydraulic cylinder shown in central longitudinal cross section;

Fig. 3 is a sectional view of my hydrostatically balanced valve mechanism adapted to distribute the working fluid between the brake mechanism and the lubrication system;

Fig. 4 is a diagrammatic view of the valve mechanism of Fig. 3 showing a change in the position of the valve plunger;

Fig. 5 is a transverse sectional view of a variable displacement pump equipped with an automatic constant pressure control mechanism forming part of the embodiment of Fig. 1;

Fig. 6 is a diagrammatic view of a hydraulic power operated system similar to that which is shown in Fig. 1 with the exception that the pumping means is of the constant volume type instead of the variable discharge type shown in the first figure.

Fig. 7 is a side elevation, partly in perspective, of the diagram shown in Fig. 6;

Fig. 8 is longitudinal sectional view of an operating valve for use in the connected oil circuit of Fig. 6, the valve being shown in one of its main operating positions;

Fig. 9 shows the valve of Fig. 8 in another main operating position;

Fig. 10 shows an example of a constant delivery pump adaptable to the arrangement of Figs. 6 and 7; and Fig. 11 shows part of a suitable driving connection between the pump of Fig. 10 and the driving engine of the vehicle.

With reference to Figs. 1 to 5 the hydraulic system or oil circuit includes a variable displacement pump (Fig. 5) such as fully described in my copending application Ser. No. 716,451, filed March 20, 1934.

For a complete understanding of the present invention it will suffice to state that the pump is of the radial rotary piston type wherein a radial series of reciprocating pistons 76 are carried in a rotary barrel 71 which barrel is mounted in a substantially cylindrical casing 70 to turn relative to a stationary valve pintle 78 rigidly supported in the casing. The valve pintle has a pressure duct 18a and a suction duct 78b which in connection with suitable respective pressure and suction ports 78c and 78d respectively convey the working fluid to and from the piston cylinders. Suitable pipes are connected to the pintle ducts 78a and 78b in the conventional manner, these pipes comprising a pressure pipe 68 and a suction pipe 69a as illustrated in Fig. 1. The pipe 69a is in communication with a sump 43 for supplying fluid to the pump. The pressure pipe 68 is in communication with a valve 57, as illustrated in Figs. 1 and 3 and will later be described. The substantially cylindrical casing 70 is suitably adapted to shiftably support an inner housing 73 forming part of a stroke controlling mechanism, the latter including a piston actuating ring 72, which is provided with appropriate circular slots as at 79 for operatively receiving cross pins 77 carried on the pistons and reciprocating therewith. As shown the shiftable ring 73 and the pump housing 70 have cooperating sliding surfaces as indicated at 73a and 70a respectively so that the housing 73 may be shifted to either side of the center line 80 of the pump housing 70. Thus it will be seen that a maximum pump discharge from zero may be obtained during the rotation of the pump by the manipulation of the shifter ring 73.

The shifter ring 73 is provided with guide and shifter rods 74 and 75 in diametrally opposite sides thereof. For the purpose of the present system, the pump is equipped with an "automatic constant pressure control". The control is automatic in that it is operated by the working or pressure fluid in such a way that at a predetermined maximum working or line pressure the control will "unload" the pump, so that the pump will only deliver sufficient volume to maintain a predetermined maximum pressure against the slip. The stroke at which the pump maintains the predetermined maximum pressure is termed the "slip stroke".

Beyond the slip stroke and the maximum pressure (which is equivalent to the constant pressure) for which the control is set, the pump will operate at variable stroke and variable pressure as will be pointed out later on.

In this application the variable discharge pump is used as a "one way" pump, the term denoting the fact that although the pump is reversible it will be manipulated to deliver fluid in one direction only. With reference to Fig. 5 assuming a clockwise rotation for the rotor 71 it will be seen that when the control rod 75 is pulled toward the left side of the pump housing 70 as by a powerful spring 91, the pump will build up pressure in the upper port 78c and sucks from the lower port 78d, since during the upper half circle of their rotation, the pistons will be on their in-stroke while during the lower half circle they will be in their out-stroke. The spring 91 acts at one end against a fixed pad portion 82' of the housing 70 and at the other against a spring housing 90, and is always in compressed condition.

In order to adjust the spring compression, the control rod 75 is threaded as at 75a on which threaded portion a collar 93 is adapted to be turned against the spring to compress it. In order to facilitate turning of the collar 93 relative to the housing 90 to adjust the effective spring force the collar is circularly recessed adjacent the end of the housing 90 to receive an anti-friction thrust bearing 92. The collar 93 may be turned by appropriate means such as the hand wheel 94 which is rigidly secured to the collar as at 95. Once adjusted, the relative position of the collar 93 and the control rod 75 is fixed with an appropriate lock nut 96 e. g. It will be seen, that by adjusting the hand wheel 94 and locking it in various adjusted positions, the spring force which holds the stroke controlling mechanism of the pump in position such that the pistons are set for maximum stroke can be varied at will.

Projecting from the opposite side of the pump casing is a control rod 74 having a piston formation as at 85 mounted in a control cylinder 83 on the pump casing. The piston proper divides the inside of the casing 83 into chambers 84 and 88. It will be seen that when working fluid enters the chamber 88 through pilot pipe 87 connected with the pressure line of the pump, it will exert a pulling force on the differential area of the piston and will act against the force of the spring at the opposite side. It is evident that when the exerted pressure on the differential piston area reaches a predetermined value equal to the effective force of the spring 91 at a given setting it will pull the control housing 73 with the piston actuating ring 72 toward the neutral or center position (line 80) reducing the stroke of the pistons 76. However, as soon as the pump delivery due to the stroke reduction reaches that minimum value which is still able to maintain the predetermined maximum line pressure, the pump will maintain that piston stroke and pressure an indefinite time at a minimum expenditure of driving power. Whenever from any cause the pressure drops in the main line and in the chamber 88, the spring 91 automatically and simultaneously increases the piston stroke by drawing the control housing 73 toward the center line 81, and the pressure and equilibrium is instantaneously restored. Now should the spring force drop due to elongation of the spring by manipulation of the hand wheel 94, the piston 85 would immediately respond by pulling the member 73 to still shorter piston stroke setting which fact would again simultaneously reduce the pressure in the system due to the decreased delivery of the pump, and so on. It will be seen that at all times there is an automatic response between line pressure and spring force and it follows that, with this control apparatus on the pump, when the pump flow is admitted to the brakes only and all the brake cylinders are filled up with operating fluid so that there is no more space for receiving the discharge of the pump, the pump discharge can be regarded as blocked by the brake cylinders which are now in their extreme positions, and therefore the pump control will unload the pump to supply the loss of fluid by slippage in the system during continued operation of the brakes. Thus there will be no heating of the working fluid by squeezing the same through forcibly restricted relief valves or throttle mechanisms, wherefore my system effects great savings in operating power while maintaining the working fluid at relatively low temperatures.

Referring to Fig. 1 it will be seen that the pump is placed into communication with the operating system for the brakes and bearings of the vehicle through an operating valve 57 shown in detail in Fig. 3.

The operating valve comprises a body member having a straight axial bore and two axially spaced circular outlet port formations 66 and 67 for outlet pipes 58 and 59 and an intermediate inlet port for an inlet pipe 68 leading from the pump pressure duct 78a. A hydrostatically balanced reciprocating valve 62, having two enlarged valve plug elements 64 and 65 permits the outlet of fluid at both pipes 58 and 59 simultaneously as shown by the arrows 60 and 61 and inlet of fluid as shown by the arrow 69, the arrows indicating the direction of flow of the working fluid at the normal setting of the valve, namely at the time the brakes are not being operated. An appropriate abutment ring 63 limits the left extreme position of the valve 62 and the extreme recesses, beyond the respective plug formations are interconnected by a conduit 62a so that the valve is free to be moved either way manually e. g.

Referring to Fig. 1, it will be seen that in the position of the valve shown in Fig. 3, the system will be under the low pump pressure, the pump will be in its illustrated maximum stroke position Fig. 5) and the parts of the motor vehicle will be fully lubricated with the maximum volume discharge of the pump. In this maximum discharge position of the pump, although the brake cylinders are exposed to the pump delivery and pressure, as pipe 59 delivers fluid to the brakes, the brakes remain inactive. This is because the shoe springs 53 are so designed in this instance that they resist the action of the fluid pressure tending to operate the brakes during the low pressure cycle. This may be effected simply by designing suitable springs 53 stronger than the exertion of the lubricating pressure in the brake cylinders 49 so that in spite of the live pressure in the brake lines 59', 59" and 59''', the brake shoes remain inactive. However, as soon as, the operating valve 57 is shifted to its brake operating position (shown in Fig. 4) the lubricating supply port 66 is blocked by the valve element 64, the entire discharge of the pump upon reaching the valve 57 will be directed through the pipe 59 into the brake supply lines 59', 59", and 59''' whereupon the brake cylinders 49 will be filled with operating fluid and the brake pistons 51 will act on the brake shoes 52, overcoming the force of the springs 53 and pressing the shoes against the brake drums 36, so long as the port 67 and pipe 59 supply the brakes only by virtue of the operating valve being held in the position of Fig. 4. It will be noted that as soon as the brake cylinders are filled up and the operating pressure reaches its predetermined maximum set by the spring tension 91 the pump stroke will be reduced automatically to a minimum, the stroke however, remaining sufficient to replace loss by slippage.

Upon the return of the operating valve 57 to the position shown in Fig. 3 the pump pressure oil will again be relieved into the lubricating system through pipe line 58 which leads to the various bearings of the crankshaft e. g. 38 and to, say, the pistons and cylinders of the engine and/or to other parts requiring forced feed lubrication. As soon as pressure is dropped to the lubricating low pressure, as a result of passing it freely through the pipe 58, which pressure is determined by a low pressure relief valve such as at 40, (spring, ball and spring adjusting screw, 39, 40 and 41 respectively), the lubricating fluid lines 58, 58', and 58" distribute the lubricating fluid to the various parts of the engine, whereas the surplus fluid will return to the sump 43 through return pipe 58a. It will be seen that the pressure of the lubricating system can be so adjusted by the relief valve spring 39 that practically no fluid will return through the relief valve into the sump during normal operation. This means that at certain lubricating pressures the maximum capacity of the pump can be determined or rather all used up for useful lubrication without discharging any appreciable amount of oil through the relief valve. The valve 57 may be moved to the extreme left and thus block entirely the flow of fluid through the pipe 59 to the brakes.

The speed of the engine or motor being variable it is apparent that the maximum operating lubricating pressure and the pump capacity will be set at the maximum speed of the engine.

In order to provide pressure lubrication for the engine cylinders and pistons during the brake operating period, that is during the direction of the entire pump volume into the brakes or during low idling speed of the engine I provide a spring loaded accumulator in the lubricating line which comprises a cylinder 45, piston 47 and a resistance spring 56.

It will be seen that under the lubricating pressure the accumulator will compress the spring 46 so that the entire cylinder chamber will be filled up with fluid pressure lubricant as a pressure storage tank. Consequently at the moment when valve plunger 64 blocks the lubricating line 58 (see Fig. 4) the accumulator will supply lubricant to the system under adequate pressure. It will also be seen that during the application of the brake, particularly during pressure holding periods, when the car stands still, the only moving parts of the engine which need lubrication are the pistons and cylinders which are idling during such standing period of the car. Therefore it will be seen that the capacity of the accumulator need not be large and therefore it may be made up of a seamless steel tubing suitably blocked at the ends and with the spring 46 and plunger 47 assembled therein as a unit. The spring 46 and plunger 47 may be omitted thus forming an air cushion chamber which will afford a more sensitive and elastic pressure responsive accumulator by virtue of the expansion and contraction of air in the chamber.

The stem of the valve 62 may be operated by an appropriate foot pedal 44, a suitable spring 44a being provided to return the valve to normal position after the operator takes his foot off the pedal.

It will be seen that my method of operating the brakes may be used with various types of brakes, not necessarily along the line of that shown in Fig. 2. Irrespective of the type used, as soon as the shoes have reached their predetermined maximum pressure, the pump will hold the brakes at that pressure indefinitely so long as the operating valve is in its brake operating position. Thus it does not take any work on part of the operator beyond holding his foot on the pedal 44 with sufficient force to hold the valve in the Fig. 4 position.

In Figs. 6 to 11 inclusive a similar hydraulic power operating brake system is illustrated with the difference that the pressure generator is a constant delivery pump driven from an appropriate rotary part of the engine such as the cam shaft 3 (Fig. 11) of the engine. In this case a somewhat different valve is necessary than in the previous system. Since a constant delivery pump such as a gear pump is now present in modern motor cars, my invention can be applied to these cars with certain modifications without departing from the spirit of my invention considered broadly, as will now be shown.

Referring in detail to Figs. 6 to 11 a gear pump comprising driving and driven pumping gears 6 to 8 respectively is driven, say by the cam shaft 3 of the engine through suitable gearing 2, 5. The pump drive shaft 4, mounted in suitable bearing means supported by the engine housing 1 carries the driving gear 6 of the pump which gear drives the driven pump gear 8. The pump may be mounted in an appropriate housing comprising parts 9 and 10 which housing is appropriately fastened to the main housing 1 of the engine. Suction and discharge connections 11 and 12 carry the pressure fluid from the sump 43 to the crankshaft bearings, piston and cylinder assemblies (through conduits 12a and 12b) while the surplus fluid will be returned to the sump through a suitable relief valve 40, such as previously described.

The operating valve 13 Fig. 8, may be constructed similarly to that previously described and the plug carrying plunger 19 may be operated through a suitable pedal connection shown as comprising an arm 29, rockshaft 28 and another arm 27, the latter being pivotally connected as at 30 with the plunger. In the normal operating condition the plunger 19 is in the position shown in Fig. 8, which is the "brake off" position. In this instance the pipe connection 24 leading to the valve from the pump is blocked by a plunger head or plug 21 so that no fluid delivered by the pump may pass through the valve, but all the fluid is directed for the purpose of lubrication as through the line 12a Figs. 6 and 7. In this "brake off" position the brake connecting pipe 25 and branches 26' and 26" are placed in communication with the return pipe 22 in a manner to be hereinafter described and the brake shoe return springs (see 53 Fig. 2) force the operating fluid through the valve as indicated by the arrows on Fig. 8, the pipe 22 freely exhausting into the sump 43. The valve head or plug 20 is so formed that while it is blocking the return port 16 of the valve (leading to discharge pipe 22) the fluid coming from the brakes through pipe 25 and flowing within the body as at 33 will be able to enter the port 16 through a passage 34. However, as soon as the valve 13 is shifted by the operator into the "brake on" position (shown diagrammatically in Fig. 9) the operating fluid will enter the valve through the pipe 24 and following the arrows shown on Fig. 9 it will pass to the brakes 36 and fill the brake cylinders 49, operating the brakes. Since the brake cylinders will occupy the pump until the cylinders are filled there will ordinarily be a temporary drop in the lubricating live pressure (line 12a and 12b) and after filling the brake cylinders the pump will then supply the lubricating line only. Thus it will be seen that the result of operating the brakes from the lubricating supply pump is at the expense of the lubricating portion of the system. To avoid any serious pressure drop a slightly larger capacity pump may be used to thus more properly effect both lubrication and brake operation simultaneously. The surplus of fluid during the "brake off" period has to pass through a pressure relief valve 40 such as previously described and thus some heat is generated signifying waste of power. Therefore the capacity of the pump must not be much larger than as required on present day vehicles for constant feed lubrication. Fig. 9 shows that during the "brake on" period the small passages 34 and 35 in the valve plug 20 are inoperative.

Referring again to the system as disclosed in Fig. 1, a few inherent advantages of the system in addition to the economical features thereof already mentioned are as follows:

Assuming the motor car on the highway is running at top speed, and the operator or driver has to slow down quickly in order to avoid a collision with another vehicle. In such instance he pushes the pedal into the "brake on" position as quickly as possible, whereupon the pump continuously and gradually builds up the maximum braking pressure and holds it irrespective of unsteady reflex movements of the feet of the operator, so long as the valve is kept in the open position. Thus the brake will be set to the maximum braking power continuously and without shock since after the valve 57 is opened to the "brake on" position it takes a certain time element until the automatic control conditions the pump for its short stroke and maximum pressure operation. The same is true when the operator relieves the brake, the release being gradually accomplished. No shock will be experienced in the vehicle as is the case with "compensating type" human power operated brakes, wherein any jerky action of the operator's foot invariably causes jerky action of the brakes.

Assuming next the same case as before but that the driver wishes only to decelerate but not stop the vehicle. He depresses the brake pedal, whereupon the automatic control starts to build up the pressure gradually and continuously simultaneously reducing the volume gradually and continuously. Since the control effects an unhindered stepless range of pressure and volume it will be observed that the maximum pressure on the brake drums through the brake cylinders is not necessarily reached during deceleration of the car, but at any braking period a distinct and different pressure is built up by the control just enough for the operator to notice that the deceleration has reached the desired degree, and he thereupon automatically releases the pedal to "brake off" position.

Since the line pressure in the chamber 88 and the force of the spring 91 are in simultaneous dynamic equilibrium while the brake is in operation it follows that the braking effect is continuous and uniform as above described and proportional to the braking movement on part of the operator.

Due to this correlation of the braking effect and braking movement it can never happen that with newly set brakes the operator has to be careful not to depress the pedal too rapidly in order to avoid excessive jerk and resultant skidding of the wheels. In case of my automatic control since the braking effect is continuous and gradual, the effects of such recent adjustment of the brakes will be compensated by the hydraulic system in the pump itself so that the operator will not be nervous and hesitate to properly operate the brakes. Fnally it may be stated that during operation of the brakes the stroke control ring 73 of the pump is kept in free floating condition through the coaction of the spring and hydraulic piston or plunger 85, wherefore the braking pressure is always equal to the actual braking requirement as well as independent of common physical or mental inadequacies of the operator.

Having thus described my invention, I claim:

1. In a motor vehicle, in combination, a motor for operating the vehicle and having moving parts requiring lubrication, hydraulically operable brakes for the vehicle, a variable delivery oil pump driven from the motor, a conduit system including lubricating oil lines leading from the pump to the said moving parts and separate lines leading to the brakes, and manually operable means associated with said lines and operable to block the flow of oil to the lubricating lines and divert substantially the entire output of the pump to the lines leading to said brakes, and means rendered operative consequent upon the last mentioned operation of the manually operable means to vary the delivery of the pump.

2. In a motor vehicle in combination, a driving motor having parts requiring lubrication, fluid pressure operable brakes for the vehicle, a variable delivery oil pump driven by the motor, control means for normally diverting the output of the pump to certain of said parts under relatively low pressure and large volume, said control means being controllable to divert the output of the pump to the brakes, and means rendered operative by said control means when the control means is operated to divert the pump output to the brakes to condition the pump for delivering oil at higher pressure.

3. In a motor vehicle, in combination, a prime mover for driving the vehicle, brakes for the vehicle adapted to be hydraulically operated, a variable delivery fluid pressure pump driven by said prime mover and having the discharge line thereof normally connected with the brakes, constantly acting means to control the pressure output of the pump to normally maintain the fluid delivered by the pump under relatively low pressure insufficient to operate the brakes, and high volume, and hydraulic means acting in opposition to the aforesaid means at the will of the operator to condition the pump for low volume delivery at high pressure sufficient for operating the brakes.

4. In a braking system of the class described, hydraulically operable brakes, a variable delivery pump and conduit means to supply operating fluid to the brakes, said conduit means having a discharge outlet to drain the fluid therefrom, a spring acting to condition the pump for normally delivering fluid at low pressure insufficient to actuate the brakes, hydraulically acting means arranged to automatically oppose the action of the spring to condition the pump for delivering fluid at higher pressure sufficient to operate the brakes consequent upon obstructing the flow of fluid from said discharge outlet, and manually operable means to obstruct said flow.

5. In a power operated hydraulic brake system, the combination of a prime mover having parts requiring lubrication, a variable delivery fluid pressure pump driven by said prime mover, a brake system adapted to be hydraulically operated, conduit means between said pump and the hydraulically operable means of said brakes, conduit means between said pump and certain of the duit means between said pump and certain of the said parts of said prime mover, valve means to block passage of the working fluid of the pump to one conduit means, and automatic control means responsive to the pressure of the pump when the valve is operated as stated to vary the operating pressure of the pump.

6. In a power operated hydraulic system for motor vehicles and the like, in combination, an engine, a variable displacement pump driven by said engine, a vehicle brake system including, a brake cylinder for each brake, fluid supply means for said brake cylinders to supply the fluid of said pump to said cylinders continuously at pressure insufficient to actuate the brakes, valve means for said supply means to control the inlet and outlet of the pressure fluid of the pump to said brake cylinders, and pressure responsive means operable by the pressure in said supply means to increase the pressure delivery to the brakes sufficiently to operate the brakes and to unload the pump at a predetermined pressure when the valve means are operated for holding the brakes under maximum pressure for an indefinite length of time, to thereby minimize the expenditure of braking power delivered by the power engine and pump respectively.

7. In a hydraulic power braking system for motor vehicles the combination of a prime mover, variable deliver fluid pressure generating means operably connected with the prime mover, a plurality of hydraulically operable brakes and conduit means connecting said brakes with said means in parallel circuit arrangement, parts to be lubricated and conduit means connecting said parts with said means, valve means associated with the aforesaid conduit means, automatic pressure responsive means associated with the pressure generating means and operable in a predetermined setting of the valve means to effect maximum discharge of fluid from the generating means to the said parts at low pressure, said valve means and pressure responsive means being operable in a different setting of the valve means to effect a gradually decreasing discharge of fluid to the brakes under higher pressure until maximum pressure value is reached and to maintain said maximum pressure as long as the valve means is in said different setting.

8. In a hydraulic power braking system for motor vehicles the combination of a prime mover, variable delivery fluid pressure generating means operably connected with the prime mover, a plurality of hydraulically operable brakes and conduit means connecting said brakes with said means in parallel circuit arrangement, parts to be lubricated and conduit means connecting said parts with said means, valve means associated with the aforesaid conduit means, automatic pressure responsive means associated with the pressure generating means and operable in a predetermined setting of the valve means to effect maximum discharge of fluid from the generating means to the said parts and the brakes when in one position at low pressure sufficient to effect lubrication but insufficient to operate the brakes, said valve means and pressure responsive means being operable to effect and maintain a gradually decreasing discharge of fluid to the brakes under higher pressure and to maintain said pressure during a predetermined setting of the valve means.

9. In a hydraulic power braking system for motor vehicles the combination of a prime mover, variable delivery fluid pressure generating means operably connected with the prime mover, a plurality of hydraulically operable brakes and conduit means connecting said brakes with said duit means connecting said brakes with said means in parallel circuit arrangement, parts to be lubricated and conduit means connecting said parts with said means, valve means associated with the aforesaid conduit means to render the same operable to effect communication between the generating means and brakes and said parts respectively, said valve means being operable to cut off the flow of fluid to the said parts, and divert the entire output of said generating means to the brakes, automatic pressure responsive means associated with the pressure generating means and operable at such time to gradually increase the pressure delivery of the generating means to a predetermined maximum irrespective of the suddenness of operation of the valve means by the operator.

10. In a hydraulic power braking system for motor vehicles, a prime mover, variable displacement fluid pressure generating means operably connected with the prime mover, a plurality of hydraulically operable brakes and lines connecting the same with the said means, manually operable valve means operatively associated with one of said lines and arranged to effect communication of the generating means therewith in "brake-on" position of the valve means at pressure initially insufficient to operate the brakes, and pressure responsive means thereupon rendered operative by the valve means in said position to control the generating means for delivering operating fluid to the brakes at increased pressure sufficient to operate the brakes and maintaining such delivery at a predetermined maximum, said pressure responsive means including a spring tending to maintain the generating means in condition to deliver fluid at low pressure and a piston arranged to oppose said action of the spring for operation of the brakes by high pressure delivery of the generating means, and means to automatically maintain the spring force and effective force of the piston in dynamic equilibrium for continuous uniform braking action of the brakes.

11. In a motor vehicle, in combination, a motor for operating the vehicle, said motor having moving parts requiring lubrication, fluid pressure operable brakes for the vehicle, a variable stroke oil pump operatively connected with the motor and driven thereby, a fluid discharge conduit system leading from the pump to said moving parts and to the brakes, valve means in said conduit system operative in one position of said valve means to block the flow to the brakes of oil which is under sufficient pressure to operate the brakes and operative in another position to admit to the brakes oil which is under sufficient pressure for operating the same, and means operated by pressure fluid which is controlled by the valve means to decrease the stroke of the pump when the valve means is in said other position.

12. In a motor vehicle, the combination with a motor for driving the vehicle and fluid pressure operated brakes for the vehicle, of a variable delivery fluid pump normally operable for supplying to the brakes fluid under relatively low pressure insufficient to operate the brakes, and means operable at the will of the operator of the vehicle to condition the pump for delivering fluid under relatively high pressure to the brakes.

ELEK K. BENEDEK.